United States Patent [19]

Tankred

[11] 4,178,140
[45] Dec. 11, 1979

[54] COMPRESSOR WITH RECIPROCATING PISTON PARTICULARLY FOR SMALL REFRIGERATORS

[75] Inventor: Hans J. Tankred, Sonderborg, Denmark

[73] Assignee: Danfoss A/S, Nordborg, Denmark

[21] Appl. No.: 938,258

[22] Filed: Aug. 30, 1978

Related U.S. Application Data

[63] Continuation of Ser. No. 774,890, Mar. 7, 1977, abandoned.

[30] Foreign Application Priority Data

Mar. 9, 1976 [DE] Fed. Rep. of Germany ....... 2609653

[51] Int. Cl.² ................... F04B 17/00; F04B 35/04; B23P 15/10
[52] U.S. Cl. .................. 417/415; 29/156.4 R; 29/156.5 A; 92/129; 123/197 AB; 123/197 AC
[58] Field of Search ............. 29/156.4 R, 156.5 A; 92/129; 417/415, 902; 123/197 AR, 197 AC

[56] References Cited

U.S. PATENT DOCUMENTS

| 2,500,751 | 3/1950 | Halfvarson | 417/902 X |
| 3,906,603 | 9/1975 | Romer et al. | 417/415 X |

*Primary Examiner*—Richard E. Gluck
*Attorney, Agent, or Firm*—Wayne B. Easton

[57] ABSTRACT

The invention relates to an electric motor and piston type compressor unit used for small refrigerators. The housing or cylinder of the compressor is attached to the motor casing and these two members, as a unit, are resiliently mounted in a sealed housing. In order to minimize the overall size of the unit, and specifically the outer housing, the piston connecting rod has a special shape at its crank end to facilitate the initial installation of the piston and connecting rod. The crank end of the connecting rod has a larger bore than the crankpin and the shape of the crank end is characterized by a recess which allows the crank end to clear the crankpin while being moved into surrounding relation to the crankpin after which a sleeve is installed between the crank end and the crankpin. The recess is strategically located so that while it facilitates the assembly operation there is no compromise or sacrifice with regard to the maximum loads the connecting rod can withstand.

1 Claim, 5 Drawing Figures

COMPRESSOR WITH RECIPROCATING PISTON PARTICULARLY FOR SMALL REFRIGERATORS

This is a Continuation Patent application of Ser. No. 774,890 filed Mar. 7, 1977, now abandoned.

The invention relates to a compressor with a reciprocating piston, particularly for encapsulated small refrigerators, of which the piston is connected by a single pivot to a connecting rod and the latter is drivable by a crank pin which is free at one side, wherein the opening in the annular big end of the connecting rod is smaller than the largest cross-section of the crank shaft of the motor but larger than the cross-section of the crank pin, a filling ring being disposed between the crank pin and big end, and wherein, when the piston is built into the cylinder and the motor crank shaft is built in, the big end is displaceable to its operating position from a position beyond the projection of the shaft.

In a known reciprocating-piston compressor, a ball joint simultaneously serving as a piston pivot, tilting pivot and rotary pivot is provided as a single pivot between the connecting rod and piston. The connecting rod can therefore be moved so that, after the piston has been built into the cylinder, the big end of the connecting rod must be swung to the side to provide space for building in the motor crank shaft. The annular big end can then be pushed over the crank pin by a tilting, rotating end pivoting motion. Finally, the filling ring is then inserted. Instead of this single pivot, the piston pivot, tilting pivot and rotary pivot can be formed separately.

It is also known to provide as a single pivot between the piston and connecting rod a cylindrical piston pin in conjunction with a cylindrical bearing in the connecting rod. Even when a filling ring is built in between the crank pin and the big end, the connecting rod cannot be brought to a position outside the path for building in the motor crank shaft. Instead, it is necessary to make the filling ring and thus also the big end so large that the motor crank shaft can be passed through the big end.

The invention is based on the problem of providing a reciprocating-piston compressor of the aforementioned kind by means of which larger forces can be transmitted.

This problem is solved according to the invention in that the pivot comprises in known manner a cylindrical piston pin and a cylindrical bearing in the connecting rod and that the annular half of the big end at one side of the plane of symmetry has substantially at the middle a recess which extends from one end and of which the side walls are spaced apart by a distance at least equal to the diameter of the crank pin.

By using the cylindrical piston pin and the cylindrical bearing, one obtains the possibility of transmitting larger forces from the motor crank shaft to the piston. The recess makes it possible to push the big end over the crank pin from a position beyond its projection after the motor crank shaft has been built in, the pivoting plane of the connecting rod as prescribed by the pivot being altered by turning the piston and its cylinder. The recess does not affect the operation because it is internally covered by the filling ring anyway and it is provided at a position that is not subjected to large forces.

If it is desired to introduce the big end through the cylinder but the dimensions of the big end are too large, the recess can be utilized to reduce the cross-section in that the big end has a bevel at the periphery substantially in the middle of the end opposite to the recess and of both ends of the other annular half, the maximum spacing between the diagonally opposite bevels being less than the cylinder diameter. With the aid of the three bevels and the recess, the cross-section is adapted to the circular cross-section of the cylinder.

The invention will now be described in more detail with reference to the example shown in the drawing, wherein.

Figure 1:
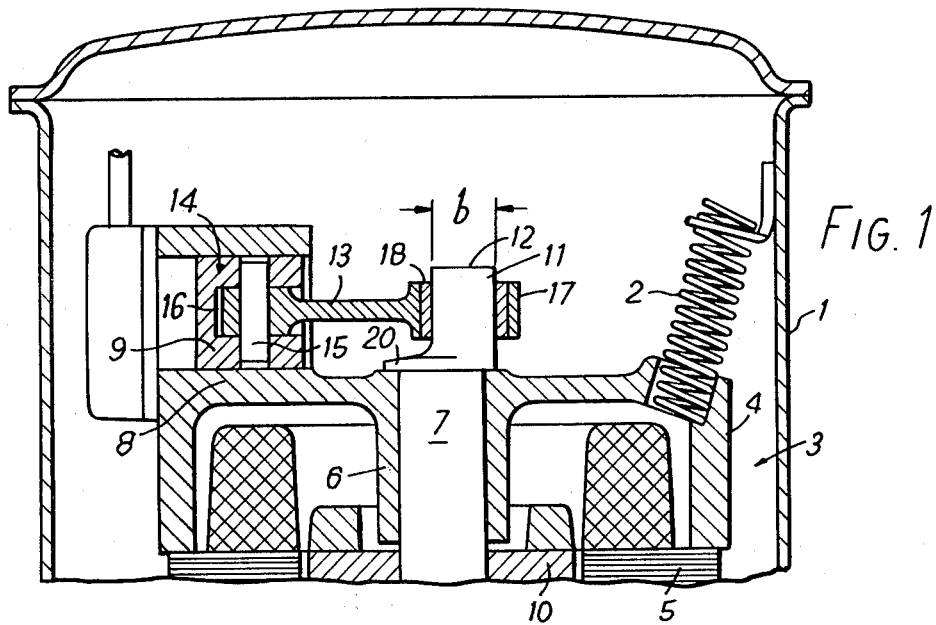
FIG. 1 is a diagrammatic longitudinal section of an encapsulated compressor with a reciprocating piston.

FIG. 1 shows a capsule 1 in which a motor compressor 3 is suspended with the aid of springs 2. A supporting body 4 serves to mount a stator 5 of an electric motor, comprises a bearing 6 for a motor crank shaft 7 and carries a cylinder 8 in which a piston 9 is reciprocabable.

Figure 5:
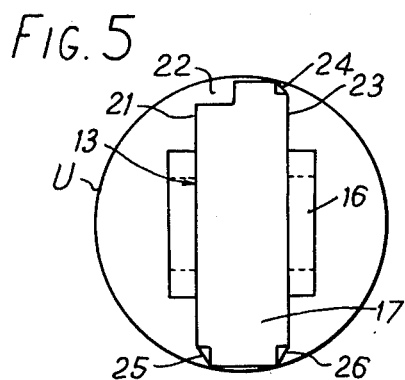
FIG. 5 is an end elevation of the FIG. 4 connecting rod.
Figure 3:
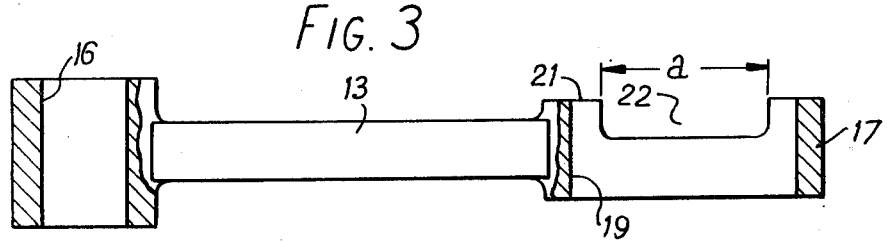
FIG. 3 is an enlarged longitudinal section of the connecting rod.
Figure 4:
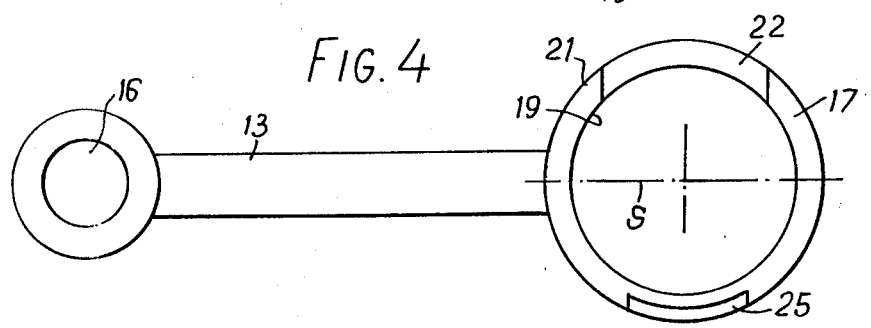
FIG. 4 is a plan view of the FIG. 3 connecting rod.

A rotor 10 is seated on the shaft 7. At the upper end it carries a crank pin 11 of which the upper end 12 is free. A connecting rod 13 is connected to the piston 9 by way of a pivot 14. The pivot 14 comprises a cylindrical pin 15 held in the piston 9 and passing through a cylindrical bearing 16 in the connecting rod 13. A substantially cylindrical big end 17 of the connecting rod surrounds the crank pin 11 with the interpositioning of a filling ring 18 of which the internal diameter corresponds to the diameter of the crank pin 11 and the external diameter corresponds to the diameter of the cylindrical opening 19 in the big end 17. This opening 19 has a smaller cross-section than the largest cross-section of the motor crank shaft 7 which is here prescribed by the co-operation of the crank pin 11 and a balancing weight 20. Lubricating means and the like have been omitted for the sake of simplicity. The annular half of the big end 17 at the side of the plane of symmetry S has substantially at the middle a recess 22 extending from the end 21. The side walls of this recess are spaced by a distance a at least equal to the diameter b of the crank pin 11. At the other end 23, a bevel 24 is provided opposite the recess 22 at the periphery. Similar bevels 25 and 26 are located on the other annular half, likewise at the middle of both ends 21 and 23. The dimensioning is such that the cross-section of the big end 17 or the connecting rod 13 recognisable in FIG. 5 is disposed entirely within the internal periphery U of the cylinder 8.

As shown in FIG. 1, the axial length of the crankpin 11 is less than the bore diameter of the cylinder B. The relatively lesser length of the crankpin and the specified recess 22 on the crank end 17 of the connecting rod 13 are interdependent factors which make the desired assembly procedure possible.

This compressor is assembled as follows. The piston 9 is inserted in the cylinder 8 and the connecting rod 13 brought to the FIG. 2 position where the big end 17 is located completely beyond the largest cross-section of the motor crank shaft 7. The piston 9 need not have been introduced in the cylinder 8 from the side of the shaft; instead, the introduction can also be made from the side of the cylinder head. Thereafter, the motor crank shaft 7 can be brought into position and the rotor 10 secured thereon. The connecting rod 13 is now pushed over the crank pin 11 by turning the piston 9 in the cylinder 8 and pivoting about the pivot 14. The last part of the pivotal motion must take place in a pivotal plane lying at only a small angle to the working plane of the connecting rod at right-angles to the shaft axis. This is possible only if the big end has the recess 22. By means of a final rotary motion, the big end then attains its operating position, whereupon the filling ring 18 is inserted.

Figure 2:
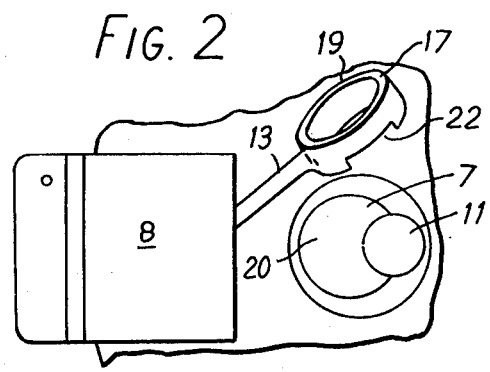
FIG. 2 is a fragmentary plan view of the compressor of FIG. 1.

Of course an axial movement can be superimposed on the rotary and pivotal motion of the connecting rod 13, for example if it is favourable for keeping free the projection of the shaft to arrange the piston 9 by displacing it in one or other directions from the position shown in FIG. 2.

I claim:

1. A compressor assembly comprising a sealed housing, an electric motor having a casing and being resiliently mounted in said housing, said motor having a vertically disposed shaft, an offset crankpin attached to the upper end of said shaft, a cylinder member having a cylindrically shaped chamber attached to the upper side of said motor casing, a piston slidably mounted in said chamber, said chamber having a diameter larger than the axial length of said crankpin, a connecting rod having a shaft portion with the piston end thereof pivotally connected through cylindrically shaped pin means to said piston and crank end thereof connected in relatively rotatable relation to said crankpin, said connecting rod crank end being a generally annularly shaped ring with annular surfaces on opposite sides thereof and having a bore larger than the diameter of said crankpin, a sleeve between said connecting rod ring and said crankpin, one of said crank end annular surfaces having a recess for facilitating assembly which is displaced 90 degrees from the front between said ring and said shaft portion and which has a width at least equal to the diameter of said crankpin.

* * * * *